(12) United States Patent
Lackey

(10) Patent No.: US 9,052,219 B2
(45) Date of Patent: Jun. 9, 2015

(54) INDUCTIVE POSITION SENSOR WITH FIELD SHAPING ELEMENTS

(71) Applicant: Continental Automotive Systems, Inc., Auburn Hills, MI (US)

(72) Inventor: John Jefferson Lackey, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 261 days.

(21) Appl. No.: 13/669,495

(22) Filed: Nov. 6, 2012

(65) Prior Publication Data

US 2014/0125327 A1   May 8, 2014

(51) Int. Cl.
*G01D 5/20* (2006.01)
*G01B 7/14* (2006.01)

(52) U.S. Cl.
CPC ............... *G01D 5/2053* (2013.01); *G01B 7/14* (2013.01)

(58) Field of Classification Search
CPC ........... G01D 5/14; G01D 5/20; G01D 5/242; G01B 7/14; G01B 7/30; H01F 5/30
See application file for complete search history.

(56) References Cited

U.S. PATENT DOCUMENTS

| | | | |
|---|---|---|---|
| 4,853,604 A | 8/1989 | McMullin et al. | |
| 5,521,494 A * | 5/1996 | Hore et al. | 324/207.16 |
| 2005/0253576 A1* | 11/2005 | Nyce | 324/207.17 |
| 2010/0127695 A1* | 5/2010 | Harris | 324/207.16 |
| 2010/0238121 A1* | 9/2010 | Ely | 345/173 |

* cited by examiner

*Primary Examiner* — Minh N Tang

(57) ABSTRACT

An inductive position sensor determines a position of an object. The sensor incudes a circuit board, a wire source coil constructed and arranged to provide a certain operating frequency, a first wire sensing coil, and a second wire sensing coil. The source coil, and first and second sensing coils are embedded in the circuit board, and each of the first and second sensing coils are constructed and arranged to provide an output as the object passes by source coil and the first and second sensing coils. Eddy current generating material is associated with any of the coils so as to provide an eddy current that interferes with wire to wire communication between the sensing coils and the source coil, so as to alter the output of the sensing coils to improve accuracy of the sensor to shape the output.

16 Claims, 3 Drawing Sheets

INDUCTIVE POSITION SENSOR WITH FIELD SHAPING ELEMENTS

FIELD

The invention relates to inductive position sensors and, more particularly, to structure and methods for correcting offset and improving linearity of the sensors.

BACKGROUND

With reference to FIG. 1, a conventional inductive position sensor, shown generally indicated at 10, includes a source coil 12, a first sensing coil 14, a second sensing coil 16 and a moving target 18. The target 18 can be any material which generates eddy currents, but is preferably aluminum since it is inexpensive and readily available. The purpose is to decrease the efficiency of induction due to eddy currents, which is useful in position sensing. FIG. 2 shows the amplitude of the AC output of sensing coil 14 in the shape of a Sine wave at 20, while the amplitude of the AC output of sensing coil 16 is shown in the shape of a Cosine wave at 22. The Sine and Cosine output of coils 14 and 16 can be combined in an arctangent (A Tan 2) calculation to produce the linear response (line 24) to the position of the target 18. This response is largely independent of the air gap and scalar amplitude.

These conventional inductive position sensors are often complex circuits that require compromise in design for many reasons, including available space in the body of the application, or often constraint of the position of the wires themselves on the PCB as they coil and lap over one another. The constraints and compromises often lead to imperfections in the linearity or offset of the transfer curve of position and output.

This problem is currently solved with offset coils (additional loops outside of the circuit which can influence the offset), or by introducing internal loops to help mitigate some of the non-linearity. Many ASIC configurations incorporate slope and offset modification software to assist with these issues, when no mechanical solution is possible (often due to mechanical constraints). Unfortunately, offset coils require a significant amount of additional board space, and that is not always available. Software solutions require expensive, higher end components, or a reduction in resolution to retain room for error compensation.

Thus, there is a need to influence the offset and linearity of the transfer curve of an inductive position sensor without the use of offset coils or software.

SUMMARY

An objective of the invention is to fulfill the need referred to above. In accordance with the principles of the present invention, this objective is obtained by providing an inductive position sensor for determining a position of an object. The sensor includes a circuit board, a wire source coil constructed and arranged to provide a certain operating frequency, a first wire sensing coil, and a second wire sensing coil. The source coil, and first and second sensing coils are embedded in the circuit board and each of the first and second sensing coils is constructed and arranged to provide an output as the object passes by the source coil and the first and second sensing coils. Eddy current generating material is associated with any of the coils so as to provide an eddy current that interferes with wire to wire communication between the sensing coils and the source coil so as to alter the output of the sensing coils to improve a shape of the output of the sensor.

In accordance with another aspect of an embodiment, a method of modifying output of an inductive position sensor provides an inductive position sensor that includes a wire source coil constructed and arranged to provide a certain operating frequency; a first wire sensing coil; and a second wire sensing coil. Each of the first and second sensing coils is constructed and arranged to provide an output as the object passes by source coil and the first and second sensing coils. Wire to wire communication between the sensing coils and the source coil is interfered with so as to alter the output of the sensing coils to improve a shape of the output of the sensor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
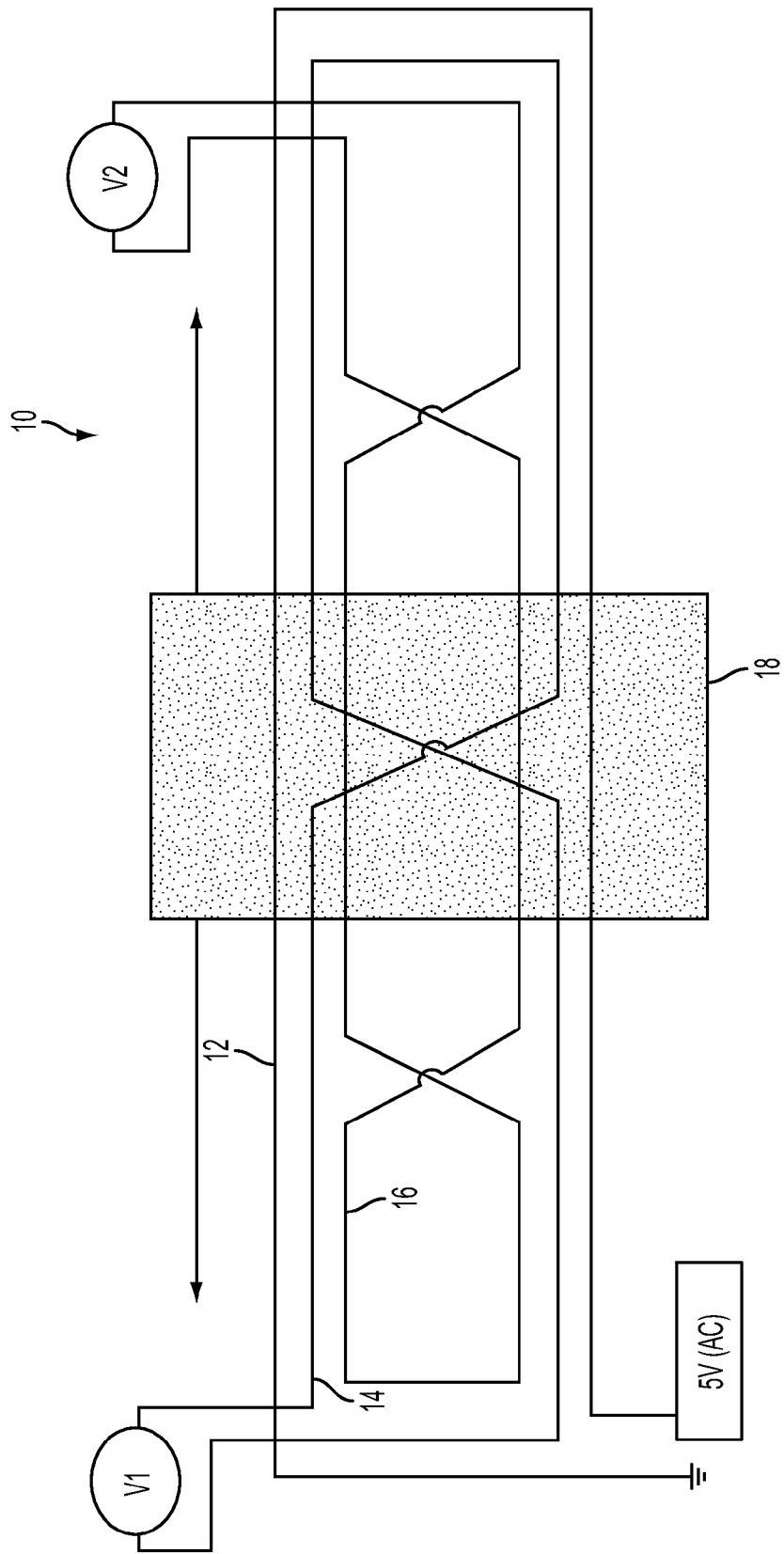
FIG. 1 is a schematic illustration of a conventional inductive position sensor.
Figure 2:
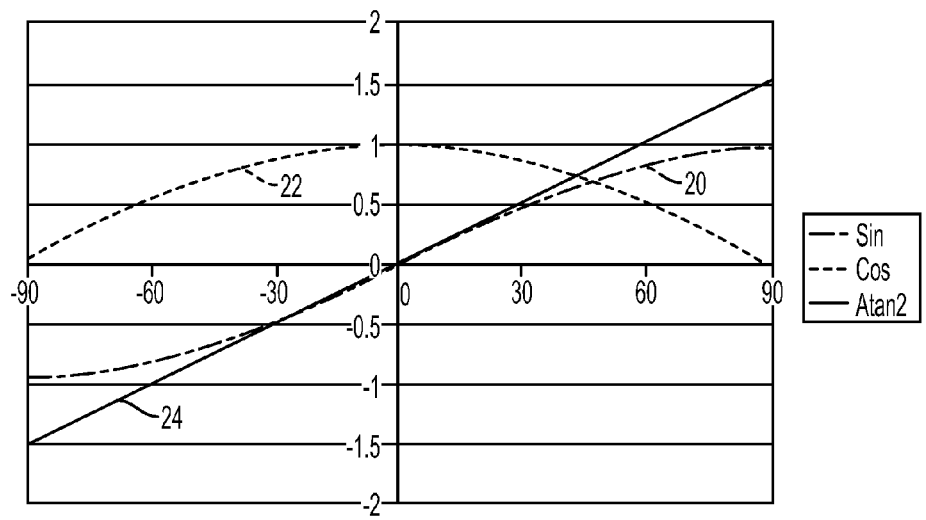
FIG. 2 is a graph showing the Sine output of a first sensing coil, the Cosine output of a second sending coil, and the A Tan 2 line of the sensor of FIG. 1.
Figures 3, 4:
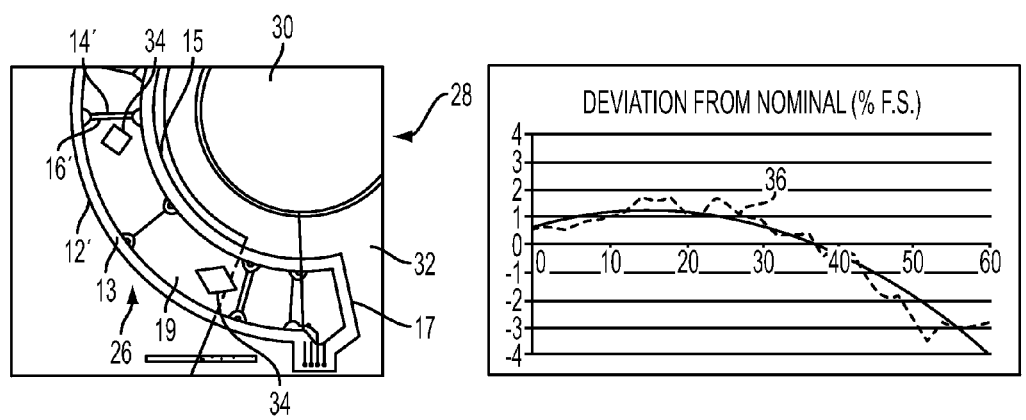
FIG. 3 is a view of an inductive position sensor for sensing the position of an associated object in accordance with a first embodiment.
FIG. 4 is a graph of the % full-scale deviation from an ideal linear transfer curve of the sensor of FIG. 3.

With reference to FIG. 3, an inductive position sensor is shown, generally indicated at 26, in accordance with a first embodiment. The sensor 26 is of the type disclosed in FIG. 1 or in U.S. Pat. No. 4,853,604 the content of which is hereby incorporated by reference into this specification. Thus, the sensor 26 includes a wire source coil 12', a first wire sensing coil 14'; and a second wire sensing coil 16'. In the embodiment, the source coil 12' surrounds the sensing coils 14', 16' and includes an external arc side 13, internal arc side 15 and a pair of ends 17 joining the arc sides 13 and 15. All coils are embedded in a stationary printed circuit board 19. The source coil 12' preferably provides a 3 MHz drive signal. The first sensing coil 14' is looped several times to provide a specific output as the object to be sensed passes over the coils 14', 16'. The second sensing coil 16' is also looped to provide a specific output as the object to be sensed passes over the coils 14', 16'. Outputs from the first and second sensing coils 14', 16' can be checked for amplitude, and are used to calculate an arctangent value A Tan 2 which is interpreted as a position of the object being sensed, relative to the coils 14', 16'.

In the embodiment, the object to be sensed is a fan assembly, generally indicated at 28, having a hub 30 with at least one fan blade 32 coupled thereto for rotation therewith. Thus, the sensor 26 determines the rotary position of the fan assembly 28, in the conventional manner, as the fan blade 32 passes over the coils 14', 16'. The sensor 26 is particularly useful in automotive applications such as vehicle transmission applications. It can be appreciated that the sensor 26 can be used to determine the position of any object that moves in a rotational or finite linear manner.

As noted above, offset coils or slope and offset modification software are typically used to correct offset or linearity issues of inductive position sensors. However, there are certain applications where there is no room to provide the external loops to correct offset and the external loops do not improve linearity issues. Also, since an ASIC is expensive, software solutions may not be cost-effective. Thus, in accordance with the invention, eddy current generating material 34 is associated with the sensor 26. The eddy current generating material 34 is any material that is good at interfering with wire to wire communication, preferably between 2-4 MHz, such as aluminum to shape the positionally dependent amplitude of the signal outputs of the first and second sensing coils 14' and 16'.

In the embodiment of FIG. 3, the eddy current generating material incudes pieces of aluminum 34, preferably diamond shaped, provided at two locations so as to be surrounded by portions of the sensing coils 14' and 16'. The pieces of aluminum 34 can be embedded in or fixed on the circuit board 19, or can be mounted in any manner so as to interfere with the wire to wire communication of the sensor 26. As shown in FIG. 4, when the pieces of aluminum 34 are employed in the sensor 26, the early portion of the error transfer curve 36 is boosted, while the later portion of the transfer curve 36 is depressed. This occurs mainly due to the orientation of the sensing coils 14', 16'. The aluminum pieces 34 stifle nearby communication by producing counter-signals to the source coil 12'. Thus, the aluminum pieces 34 inhibit the coupling effect at strategic locations and modify the linearity and offset so as to improve linearity of the sensor 26. The pieces 34 can even enable special regions of the sensor 26 to work differently than other regions.

Figure 5:
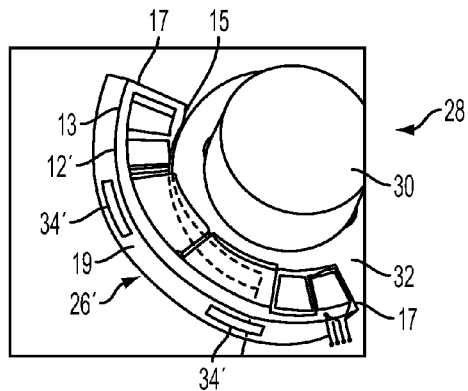
FIG. 5 is a view of an inductive position sensor for sensing the position of an associated object in accordance with a second embodiment.
Figure 6:
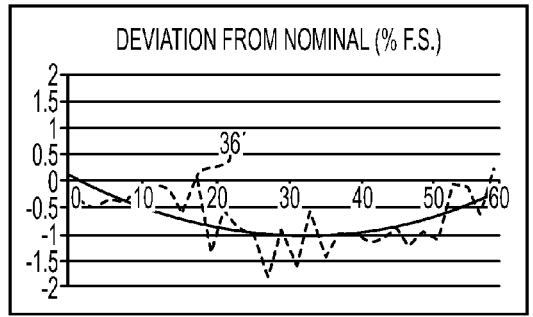
FIG. 6 is a graph of the % full-scale deviation from an ideal linear transfer curve of the sensor of FIG. 5.

In the embodiment of FIG. 5, the eddy current generating material incudes pieces of aluminum 34' provided at two locations so as to be external and adjacent to the side 13 of the source coil 12'. The pieces of aluminum 34' can be embedded in or fixed on the circuit board 19, or can be mounted in any manner so as to interfere with the wire to wire communication of the sensor 26'. As shown in FIG. 6, when the pieces of aluminum 34' are employed in the sensor 26', the transfer curve 36' shows a small depression in the linearity near the center stroke. The entire offset is also slightly depressed. This effect appears weaker (per sq. mm of aluminum) than placing the aluminum pieces 34' inside the secondary coils 14', 16', but does not harm the span of coupling factors.

Figure 7:
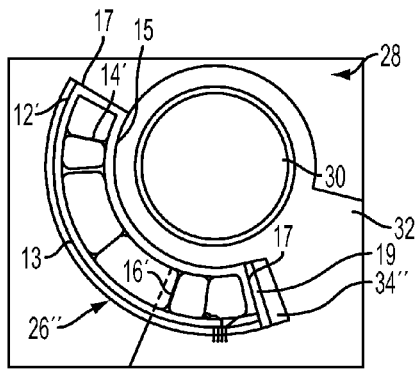
FIG. 7 is a view of an inductive position sensor for sensing the position of an associated object in accordance with a third embodiment.
Figure 8:
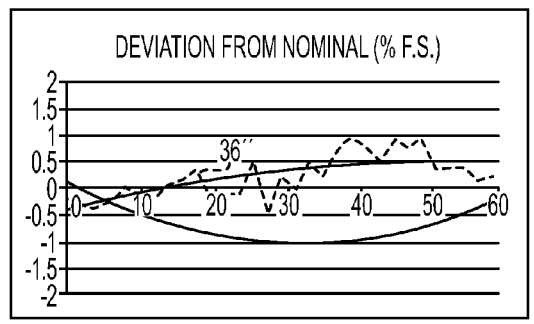
FIG. 8 is a graph of the % full-scale deviation from an ideal linear transfer curve of the sensor of FIG. 7.

In the embodiment of FIG. 7, the eddy current generating material incudes at least one piece of aluminum 34" external and adjacent to one end 17 of the source coil 12'. The piece of aluminum 34" can be embedded in or fixed on the circuit board 19, or can be mounted in any manner so as to interfere with the wire to wire communication of the sensor 26". As shown in FIG. 8, when the piece of aluminum 34" is employed in the sensor 26", a bulge occurs in the latter third of the error transfer curve 36". This effect appears weaker (per sq. mm of aluminum) than placing the aluminum piece 34" inside the secondary coils 14', 16', but does not harm the span of coupling factors.

Figure 9:
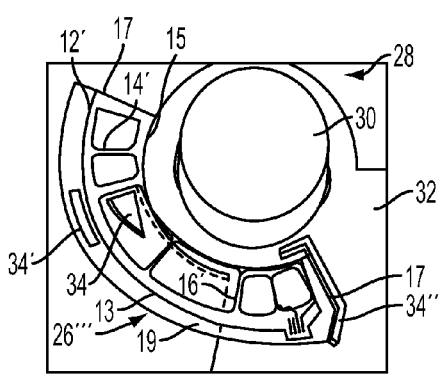
FIG. 9 is a view of an inductive position sensor for sensing the position of an associated object in accordance with a fourth embodiment.
Figure 10:
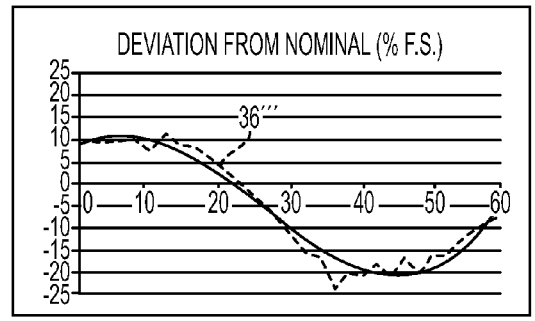
FIG. 10 is a graph of the % full-scale deviation from an ideal linear transfer curve of the sensor of FIG. 9.

In the embodiment of FIG. 9, the eddy current generating material incudes a plurality of pieces of aluminum that combines the embodiments of FIGS. 3, 5 and 7. Thus, at least one aluminum piece 34 is surrounded by a portion of the sensing coils 14' and 16', at least one aluminum piece 34' is external and adjacent to side 13 of the source coil 12', and an aluminum piece 34" is external and adjacent to one end 17 of the source coil 12'. The pieces of aluminum 34, 34' and 34" can be embedded or fixed in the circuit board 19, or can be mounted in any manner so as to interfere with the wire to wire communication of the sensor 26'''. As shown in FIG. 10, when the pieces of aluminum 34, 34" and 34''' are employed in the sensor 26''', the error transfer curve 36''' shows a significant influence on the shape and offset of the overall linearity of the A Tan 2 calculation.

The aluminum pieces 34, 34", 34''' can be placed anywhere so as to affect the wire to wire communication of the sensors 26, 26', 26", 26'''. They will have a small or large effect on the output depending on their placement, and depending on how much aluminum is used. The location, amount of material being used, and even the material purity or amount of eddy current effect of the material, all go together to help determine how much influence each piece will have on the output of the sensor, thus improving the accuracy thereof. Depending on the non-linearity or offset problems that the sensor is having, the needs of that sensor will require different locations, sizes, and even possible require different materials.

Instead of providing the pieces of aluminum or other pieces of material as the eddy current generating material as disclosed above, the eddy current generating material can be eddy current generation material provided as the ground plane of the printed circuit board 19. For example, aluminum material could replace the copper material that is typically used in the circuit board ground plane. Because of the eddy current effect of aluminum, the aluminum ground plane dampens the communication between wire (any of the coils) near the location of the aluminum.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An inductive position sensor for determining a position of an object, the sensor comprising:
    a circuit board,
    a wire source coil constructed and arranged to provide a certain operating frequency,
    a first wire sensing coil,
    a second wire sensing coil,
    wherein the source coil, and first and second sensing coils are embedded in the circuit board, and each of the first and second sensing coils is constructed and arranged to provide an output as the object passes by source coil and the first and second sensing coils, and eddy current generating material, separate from the object, associated with any of the coils so as to provide an eddy current that interferes with wire to wire communication between the sensing coils and the source coil so as to alter the output of the sensing coils to shape the output, wherein the source coil surrounds the first and second sensing coils and wherein at least two pieces of eddy current generating material are surrounded by portions of the sensing coils.

2. The sensor of claim 1, wherein the material of each of the two pieces is aluminum, or other material capable of producing eddy current.

3. The sensor of claim 1, wherein the two pieces of material are each embedded in the circuit board, or integrated into the sensor.

4. The sensor of claim 1, wherein the two pieces of material are each diamond shaped.

5. The sensor of claim 1, wherein the source coil includes first and second sides and a pair of ends joining the sides.

6. The sensor of claim 5, wherein at least two pieces of eddy current generating material are external and adjacent to one of the sides of the source coil.

7. The sensor of claim 6, wherein the material of each of the two pieces is aluminum, or other material capable of producing eddy current.

8. The sensor of claim 6, wherein the two pieces of material are each embedded in the circuit board, or integrated into the sensor.

9. The sensor of claim 5, wherein at least one piece of eddy current generating material is external and adjacent to one of the ends of the source coil.

10. The sensor of claim 9, wherein the material of the at least one piece is aluminum, or other material capable of producing eddy current.

11. The sensor of claim 9, wherein the at least one piece of material is embedded in the circuit board, or integrated into the sensor.

12. The sensor of claim 5, wherein at least one piece of eddy current generating material is external and adjacent to one of the ends of the source coil, at least one other piece of eddy current generating material is surrounded by a portion of each of the first and second sensing coils, and at least yet another piece of eddy current generating material is external and adjacent to one of the sides of the source coil.

13. The sensor of claim 12, wherein the material each of the pieces is aluminum, or other material capable of producing eddy current.

14. The sensor of claim 12, wherein each of the pieces of material is embedded in the circuit board, or integrated into the sensor.

15. A method of modifying output of an inductive position sensor, the method comprising the steps of:
providing an inductive position sensor comprising a wire source coil constructed and arranged to provide a certain operating frequency; a first wire sensing coil; and a second wire sensing coil, each of the first and second sensing coils being constructed and arranged to provide an output as the object passes by the source coil and the first and second sensing coils, and interfering with wire to wire communication between the sensing coils and the source coil so as to alter the output of the sensing coils,
wherein the step of interfering provides eddy current generating material, separate from the object, and associated with any of the coils,
wherein the source coil surrounds the first and second sensing coils and wherein at least two pieces of eddy current generating material are surrounded by portions of the sensing coils.

16. The method of claim 15, wherein the eddy current generating material is provided as aluminum material, or other material capable of producing eddy current.

* * * * *